(No Model.)
R. S. WINDSOR.
PLOW.
No. 329,609. Patented Nov. 3, 1885.
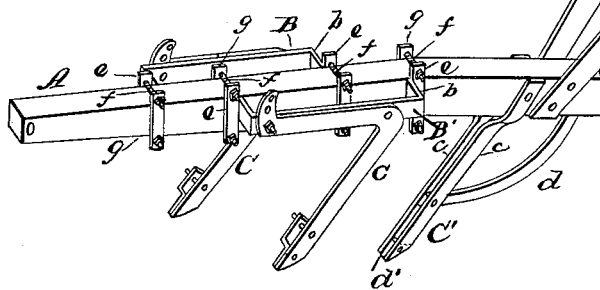
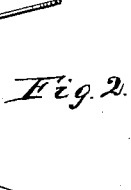
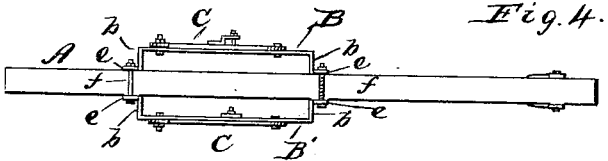
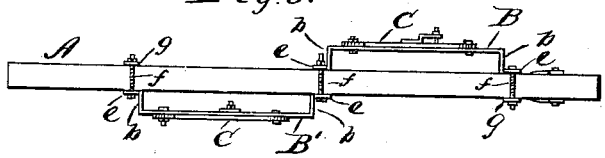
WITNESSES
P. W. Hale,
J. M. Yznaga.
INVENTOR
Richard S. Windsor,
By his Attorney

UNITED STATES PATENT OFFICE.

RICHARD S. WINDSOR, OF AMERICUS, GEORGIA.

PLOW.

SPECIFICATION forming part of Letters Patent No. 329,609, dated November 3, 1885.

Application filed January 16, 1885. Serial No. 153,089. (No model.)

*To all whom it may concern:*

Be it known that I, RICHARD S. WINDSOR, a citizen of the United States, residing at Americus, in the county of Sumter and State of Georgia, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in gang plows and cultivators, and has for its object to provide a strong, compact, cheap, and efficient implement, which may be readily adjusted to suit various soils and different plants to be cultivated.

The improvement consists in a novel combination, with a main plow-beam, of side bars carrying plow-standards and adjustable along the length of the beam, so as to bring the plows in the desired relation to each other, all as will be hereinafter particularly described, and definitely pointed out in the appended claim.

In the accompanying drawings, Figure 1 is a perspective view of a plow constructed according to my invention. Fig. 2 is a plan view of the same. Fig. 3 is a perspective view of one of the side bars with its clip-plates and plow-standard. Fig. 4 is a plan view with the side bars adjusted differently from Figs. 1 and 2. Fig. 5 is another plan view illustrating still another adjustment of the side bars.

The letter A designates the main beam of the plow, and B B' are the side bars, to which are secured in the usual manner the adjustable plow-standard C C. A rear standard, C', is secured directly to the beam and braced by a brace-bar, *d*. This rear standard has a peculiar construction, which will be presently described. Each of the side bars B and B' is made of one piece of iron bent at right angles near its ends, as shown at *b b*, to form arms, which terminate in cross-heads *e e*, somewhat longer than the plow-beam is wide, and provided with holes for bolts, as at *f*, to pass above and below said beam. For each of the cross-heads *e e* is provided a clip-piece, *g*, to stand upon the opposite side of the beam from the cross-heads. The beam is clamped firmly between the cross-heads and clip-pieces by means of the bolts *f*, and thus the side bars may be firmly held at any place along the beam. By using these cross-heads and clip-pieces, constructed to take bolts above and below the beam, I avoid boring bolt-holes in the beam, which would very much weaken it if a sufficient number were bored to allow all the adjustments which are desirable. It is not always necessary to use the clip-pieces *g*, as the two side bars may in some cases be arranged directly opposite each other on the beam, and in such case two opposite cross-heads may be bolted together and clamp the beam between them, as shown in Figs. 4 and 5. When, however, rough and trashy lands are to be plowed, it is better to have the plows arranged obliquely with relation to each other and so far apart that trash—such as cornstalks, weeds, stones, &c.—will become entirely disengaged from a plow or standard in front before being caught by a following plow or standard. To arrange the plows obliquely, the side bars will be adjusted to lap each other on opposite sides of the beam, as shown in Figs. 1 and 2, or so that the whole space on the opposite side of the beam from each side bar will be vacant, as shown in Fig. 5. In the adjustment shown in Figs. 1 and 2 the clip-pieces *g* must be used at both ends of each side bar, while in Fig. 5 the rear cross-head of the front side bar is bolted to the front cross-head of the rear side bar. Any kind of shares or plow-points may be secured to the standard according to the work to be done.

In using the implement as a cultivator the side bars are usually arranged directly opposite each other and shovel or cultivator points are secured to the standards. The arms *b* of the side bars may be of any desired length so that the side bars may stand off as required from the beam, and I prefer to provide each beam with two or more sets of side bars for plowing or cultivating at different widths. For the side bars I generally use iron about two inches wide and a half-inch thick for the main portion and arms, while the cross-heads are a half-inch thick, about two inches wide, and four inches long. Of course these dimensions may be varied as the circumstances may require. The side bars may be from six inches to three feet long—preferred about nine inches. The rear standard, C', is composed of two precisely or nearly similar bars of iron, c c, bent at their tops for convenience of attachment to opposite sides of the beam, while their main portions are parallel and about one inch apart with a brace-block, d', secured between their lower ends. The lower end of the brace-bar d is riveted or bolted between the bars c c, and its upper end is bolted to the beam. Suitable handles are used, as on other plows and cultivators.

I am aware that a plow-beam has been provided with longitudinally-adjustable brackets carrying plow-standards, said brackets being secured to the beam by wedge-clamps, and I do not claim such a plow.

Having now fully described my invention, I claim and desire to secure by Letters Patent—

The combination, with the plow-beam, of the side bars having end portions bent toward the beam and provided with cross-heads arranged to receive the bolts above and below the beam, said bolts connecting opposite cross-heads or cross-heads and clip-pieces, substantially as described, and for the purpose set forth.

In testimony whereof I affix my signature in presence of two witnesses.

RICHD. S. WINDSOR.

Witnesses:
 HENRY S. DAVIS,
 E. A. SPEER.